(12) United States Patent
Hartley (10) Patent No.: US 10,523,802 B2
(45) Date of Patent: Dec. 31, 2019

(54) HANDS-FREE SYSTEMS AND METHODS HANDING NON-STANDARD ATTENTION COMMANDS

(71) Applicant: GM GLOBAL TECHNOLOGY OPERATIONS LLC, Detroit, MI (US)

(72) Inventor: Steven Hartley, Pointe-Claire (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 15/782,927

(22) Filed: Oct. 13, 2017

(65) Prior Publication Data

US 2019/0116254 A1   Apr. 18, 2019

(51) Int. Cl.
| | |
|---|---|
| *H04M 1/60* | (2006.01) |
| *H04W 4/00* | (2018.01) |
| *H04W 76/30* | (2018.01) |
| *H04W 76/14* | (2018.01) |
| *H04W 4/48* | (2018.01) |
| *H04W 4/80* | (2018.01) |

(52) U.S. Cl.
CPC .......... *H04M 1/6075* (2013.01); *H04W 4/48* (2018.02); *H04W 76/14* (2018.02); *H04W 76/30* (2018.02); *H04M 2250/02* (2013.01); *H04W 4/80* (2018.02)

(58) Field of Classification Search
CPC combination set(s) only.
See application file for complete search history.

(56) References Cited

U.S. PATENT DOCUMENTS 8,976,724 B2 * 3/2015 Hauser ................ H04W 88/04
370/315
9,936,278 B1 * 4/2018 McGary ............... H04R 1/1041
(Continued)

OTHER PUBLICATIONS

Alps, Alps Embedded Audio Gateway Beta5.2 AT Command Reference List Document Version 1.0, 2005 <http://www.adaptivemodules.com/assets/File/ag_beta5-2_at_v1-0.pdf> (Year: 2005).*
(Continued)

*Primary Examiner* — Yuwen Pan
*Assistant Examiner* — Erica L Fleming-Hall (57) ABSTRACT

A Bluetooth transceiver module is configured to pair with a mobile electronic device that is configured to communicate with a cellular network. A hands-free module is configured to, while the mobile electronic device is paired, selectively generate attention commands for transmission to the mobile electronic device, the attention commands including: standard attention commands that are defined by a Bluetooth Hands-Free Profile (HFP) specification; and non-standard attention commands that are not defined by the Bluetooth HFP specification. The Bluetooth transceiver module is further configured to: transmit the attention commands to the mobile electronic device; from the mobile electronic device, receive: first responses to standard attention commands, respectively; and second responses to non-standard attention commands; and, in response to receipt of one of the second responses to a non-standard attention command that is not defined by the Bluetooth HFP specification, pass the one of the second responses to the hands-free module.

17 Claims, 4 Drawing Sheets

(56) References Cited

U.S. PATENT DOCUMENTS

| | | | | |
|---|---|---|---|---|
| 2005/0071714 A1* | 3/2005 | Soga | ............... | H04L 1/0036 |
| | | | | 714/704 |
| 2008/0036586 A1* | 2/2008 | Ohki | ............... | G01C 21/362 |
| | | | | 340/539.13 |
| 2010/0151788 A1* | 6/2010 | Rahman | ............ | H04M 1/6066 |
| | | | | 455/41.2 |
| 2010/0273417 A1* | 10/2010 | Tian | ............... | H04M 1/6066 |
| | | | | 455/41.2 |
| 2011/0021173 A1* | 1/2011 | Randhawa | ............ | H04W 4/90 |
| | | | | 455/404.1 |
| 2011/0255454 A1* | 10/2011 | Hauser | ............... | H04W 88/04 |
| | | | | 370/311 |
| 2013/0260672 A1* | 10/2013 | Patil | ............... | H04M 1/7253 |
| | | | | 455/7 |
| 2016/0112556 A1* | 4/2016 | Choi | ............... | H04M 1/6075 |
| | | | | 455/569.2 |
| 2019/0019516 A1* | 1/2019 | Van Hoecke | ......... | G10L 15/265 |

OTHER PUBLICATIONS

Silicon Labs, AN992: Hands-Free and Headset Profiles iWrap Application Note, Apr. 6, 2017 <https://www.silabs.com/documents/login/application-notes/AN992.pdf> (Year: 2017).*

Apple Developer "Bluetooth Accessory Design Guidelines for Apple Products"; Release R8; Jun. 16, 2017, 52 Pages.

BARB; "RFCOMM With TS 07.1Q—Serial Port Emulation"; Bluetooth Specification; Nov. 6, 2012, 29 Pages.

Bluetooth Special Interest Group, "Hands-Free Profile 1.7.1—Bluetooth Profile Specification"; Telephony Working Group; Dec. 15, 2015, 144 Pages.

* cited by examiner

HANDS-FREE SYSTEMS AND METHODS HANDING NON-STANDARD ATTENTION COMMANDS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and more particularly to hands-free control systems and methods of vehicles.

As use of mobile electronic devices (e.g., mobile phones and tablet devices) has become more common, vehicles have increasingly been designed to accommodate and interact with mobile electronic devices. For example, some vehicles include ports (e.g., Universal Serial Bus (USB) ports), that can be used to connect mobile electronic devices to a vehicle by wire. A user may connect a mobile electronic device to a vehicle, for example, to charge a battery of the mobile electronic device, to facilitate interaction between the mobile electronic device and the vehicle, or for other reasons.

Some vehicles also include wireless transceivers that can be used to connect wirelessly to mobile electronic devices. For example, some vehicles include one or more Bluetooth transceiver that can be used to establish a pairing with mobile electronic devices for wireless communication between vehicle and mobile electronic device. For example, when a mobile electronic device is wirelessly paired with a vehicle via a Bluetooth transceiver module, one or more user input devices of the vehicle (e.g., buttons, switches, microphones, etc.) may be used to prompt the mobile electronic device to perform various actions without the user directly interacting with the mobile electronic device.

SUMMARY

In a feature, a hands-free system of a vehicle is described. A Bluetooth transceiver module is configured to pair with a mobile electronic device that is configured to communicate with a cellular network. A hands-free module is configured to, while the mobile electronic device is paired, selectively generate attention commands for transmission to the mobile electronic device, the attention commands including: standard attention commands that are defined by a Bluetooth Hands-Free Profile (HFP) specification; and non-standard attention commands that are not defined by the Bluetooth HFP specification. The Bluetooth transceiver module is further configured to: transmit the attention commands to the mobile electronic device; from the mobile electronic device, receive: first responses to the standard attention commands defined by the Bluetooth HFP specification, respectively; and second responses to non-standard attention commands that are not defined by the Bluetooth HFP specification; and, in response to receipt of one of the second responses to a non-standard attention command that is not defined by the Bluetooth HFP specification, pass the one of the second responses to the hands-free module.

In further features, the Bluetooth transceiver module is configured to, in response to receipt of the one of the second responses: not automatically disconnect from the mobile electronic device and end the pairing; and pass the one of the second responses to the hands-free module.

In further features, the hands-free module is further configured to process the one of the second responses.

In further features: the hands-free module is further configured to, in response to the one of the second responses, selectively command the Bluetooth transceiver module to disconnect from the mobile electronic device and end the pairing; and the Bluetooth transceiver module is configured to disconnect from the mobile electronic device and end the pairing in response to the command.

In further features, the Bluetooth transceiver module is configured to: compare the non-standard attention command that is not defined by the Bluetooth HFP specification with a stored list including only attention commands that are defined by the Bluetooth HFP specification; and pass the one of the second responses to the hands-free module based on the non-standard attention command not being included in the stored list.

In further features, the Bluetooth transceiver module is configured to: compare a command portion of the non-standard attention command with a stored list including only predetermined command portions of attention commands that are defined by the Bluetooth HFP specification; and pass the one of the second responses to the hands-free module based on the command portion of the non-standard attention command not being included in the stored list.

In further features, the Bluetooth transceiver module is configured to: compare a response portion of the one of the second responses with a stored list including only predetermined portions of attention commands that are defined by the Bluetooth HFP specification; and pass the one of the second responses to the hands-free module based on the response portion of the one of the second responses not being included in the stored list.

In further features, the Bluetooth transceiver module is configured to: compare the one of the second responses with a stored list including only the first responses to attention commands that are defined by the Bluetooth HFP specification, respectively; and pass the one of the second responses to the hands-free module based on the one of the second responses not being included in the stored list.

In further features, the non-standard attention command includes an attention command that is specific to one mobile electronic device manufacturer.

In further features, the non-standard attention command includes an attention command that is specific to one operating system.

In further features, the Bluetooth HFP specification includes the Bluetooth HFP specification version 1.7.X where X is an integer greater than or equal to 0.

In a feature, a system includes: the hands-free system; and the mobile electronic device that is configured to communicate with the cellular network.

In further features, the mobile electronic device is configured to, while paired: receive standard attention commands that are defined by a Bluetooth HFP specification; receive non-standard attention commands that are not defined by a Bluetooth HFP specification; generate the first responses to the standard attention commands that are defined by the Bluetooth HFP specification, respectively; generate the second responses to the non-standard attention commands that are not defined by the Bluetooth HFP specification; and transmit the first and second responses to the Bluetooth transceiver module.

In further features, the mobile electronic device is configured to generate the second responses to indicate a predetermined error in response to determinations that the non-standard attention commands are not included in a stored list including only attention commands defined by the Bluetooth HFP specification.

In further features, the mobile electronic device is configured to, in response to determinations that the standard attention commands are included in the stored list: process the standard attention commands according to predetermined rules; and generate the first responses based on the processing of the standard attention commands, respectively.

In a feature, a hands-free system includes: a mobile electronic device that is configured to communicate with a cellular network; and a vehicle including: a Bluetooth transceiver module configured to pair with the mobile device; and a hands-free module configured to, while the mobile electronic device is paired, selectively generate attention commands for transmission to the mobile electronic device, the attention commands including: standard attention commands that are defined by a Bluetooth Hands-Free Profile (HFP) specification; and non-standard attention commands that are not defined by the Bluetooth HFP specification, where the Bluetooth transceiver module is further configured to: transmit the attention commands to the mobile electronic device; from the mobile electronic device, receive: first responses to the standard attention commands defined by the Bluetooth HFP specification, respectively; and second responses to non-standard attention commands that are not defined by the Bluetooth HFP specification; and in response to receipt of one of the second responses to a non-standard attention command that is not defined by the Bluetooth HFP specification: not automatically disconnect from the mobile electronic device and end the pairing; and pass the one of the second responses to the hands-free module, where the hands-free module is further configured to selectively one of: process the one of the second responses; and command the Bluetooth transceiver module to disconnect from the mobile electronic device and end the pairing, wherein the Bluetooth transceiver module is further configured to: compare a response portion of the one of the second responses with a stored list including only predetermined portions of attention commands that are defined by the Bluetooth HFP specification; and pass the one of the second responses to the hands-free module based on the response portion of the one of the second responses not being included in the stored list, where the non-standard attention command includes an attention command that is specific to one of: one mobile electronic device manufacturer; and one operating system, and where the Bluetooth HFP specification includes the Bluetooth HFP specification version 1.7.X where X is an integer greater than or equal to 0.

In a feature, a hands-free method for a vehicle includes: by a Bluetooth transceiver module of the vehicle, pairing with a mobile electronic device that is configured to communicate with a cellular network; selectively generating attention commands for transmission to the mobile electronic device, the attention commands including: standard attention commands that are defined by a Bluetooth Hands-Free Profile (HFP) specification; and non-standard attention commands that are not defined by the Bluetooth HFP specification, by the Bluetooth transceiver module: transmitting the attention commands to the mobile electronic device; from the mobile electronic device, receiving: first responses to the standard attention commands defined by the Bluetooth HFP specification, respectively; and second responses to non-standard attention commands that are not defined by the Bluetooth HFP specification; and by the Bluetooth transceiver module, in response to receipt of one of the second responses to a non-standard attention command that is not defined by the Bluetooth HFP specification, passing the one of the second responses to a hands-free module of the vehicle.

In further features, the hands-free method includes, in response to receipt of the one of the second responses: not automatically disconnecting from the mobile electronic device and not ending the pairing.

In further features, the hands-free method includes, by the hands-free module, processing the one of the second responses.

In further features, the Bluetooth HFP specification includes the Bluetooth HFP specification version 1.7.X where X is an integer greater than or equal to 0.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a hands-free system that allows a user to prompt a mobile electronic device that is paired with the vehicle to perform various functions without the user directly interacting with the mobile electronic device. Mobile electronic devices include mobile cellular phones (e.g., smartphones) and other types of mobile electronic devices (e.g., tablets) having one or more cellular network transceivers configured to communicate with one or more cellular networks. For example, the hands-free system allows the user to prompt the mobile electronic device to make, end, join, and hold calls via a cellular network.

The hands-free system includes a Bluetooth transceiver that communicates with mobile electronic devices via a Bluetooth communication protocol. When the mobile electronic device is paired with the vehicle, the Bluetooth transceiver transmits attention (AT) commands to the mobile electronic device to prompt the mobile electronic device to perform respective functions. All of the possible attention commands that the Bluetooth transceiver can transmit are defined by the Bluetooth Hands-free Profile (HFP) specification, such as the Bluetooth HFP specification version 1.7.1 or later. The attention commands defined by the Bluetooth HFP specification may be referred to as standard attention commands.

The attention commands defined by the Bluetooth HFP specification, however, are not device, manufacturer, or vendor specific. For example, the Bluetooth HFP specification does not include attention commands that are specific to a brand of mobile electronic device manufactured by a specific manufacturer (e.g., Apple, Inc., Alphabet, Inc., etc.), a specific type of code (e.g., iOS, Android, etc.) executed by mobile electronic devices, or specific features or components of mobile electronic devices.

Mobile electronic devices that can be paired with a vehicle are configured to process the attention commands defined by the Bluetooth HFP specification and transmit corresponding responses in return. When the vehicle transmits an attention command that is not defined by the Bluetooth HFP specification to the mobile electronic device, however, the mobile electronic device may or may not be able to process that attention command. Regardless of whether the mobile electronic device is configured to process the attention command that is not defined by the Bluetooth HFP specification, the Bluetooth HFP specification requires the mobile electronic device to return a response including a predetermined error message.

In response to the response including the predetermined error message, the vehicle may end the pairing with the mobile electronic device and disconnect from the mobile electronic device. This, however, does not allow for transmission and reception of attention commands other than the standard attention commands defined by the Bluetooth HFP specification. This also results in automatic disconnection and ending of paring in response to the transmission of an attention command that is not defined by the Bluetooth HFP specification.

There is a need for systems and methods for transmission and reception of non-standard attention commands that are not defined by the Bluetooth HFP specification. There is also a need for systems and methods for transmission and reception of responses to non-standard attention commands without automatically causing ending of a pairing and disconnection between vehicles and mobile electronic devices.

According to the present disclosure, the Bluetooth transceiver of a vehicle is configured to transmit standard attention commands defined by the Bluetooth HFP specification and non-standard attention commands that are not defined by (and not included in) the Bluetooth HFP specification. A mobile electronic device that is paired with the vehicle is configured to receive both standard attention commands defined by the Bluetooth HFP specification and non-standard attention commands that are not defined by the Bluetooth HFP specification.

When a non-standard attention command is received, instead of automatically generating a response including the predetermined error message, the mobile electronic device may determine whether the mobile electronic device is configured to process the non-standard attention command. If so, the mobile electronic device may process the non-standard attention command and transmit a corresponding response to the vehicle. Given that the received attention command was non-standard, the response is also non-standard and not defined by the Bluetooth HFP specification. If the mobile electronic device is not configured to process the non-standard attention command, the mobile electronic device may transmit a response including the predetermined error message to the vehicle.

In response to receipt of a response including the predetermined error message or a non-standard response, the Bluetooth transceiver of the vehicle is configured to not automatically end the pairing and disconnect from the mobile electronic device. The Bluetooth transceiver instead transfers the response to a hands-free application. The hands-free application is configured to process non-standard responses received in response to non-standard attention commands. In response to receipt of a response including the predetermined error message, the hands-free application may be configured to end pairing and disconnect under some circumstances and to take one or more other actions under other circumstances.

This increases user accessibility to features/functions that the mobile electronic device can perform. This also increases user perception of the hands-free system of the vehicle by not automatically disconnecting in response to receipt of a non-standard response or a response including the predetermined error message.

Figure 1:
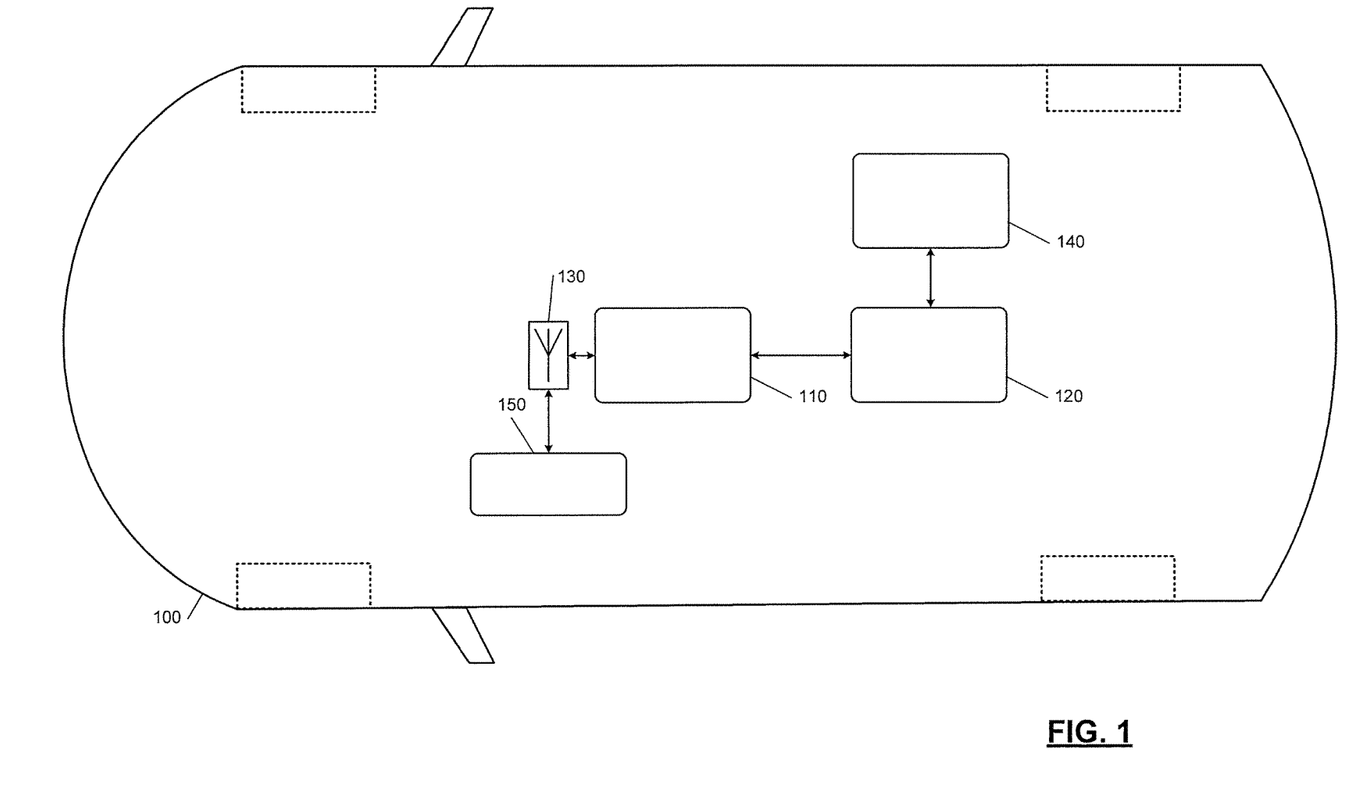
FIG. 1 is a functional block diagram of an example vehicle system including a hands-free system.

FIG. 1 is a functional block diagram of an example vehicle 100 including a hands-free system. The hands-free system comprises a Bluetooth transceiver module 110, a hands-free module 120, an antenna 130, and one or more user input devices, such as user input device 140. Examples of user input devices include touchscreen displays (e.g., of infotainment systems), physical buttons, switches, and knobs, microphones, and other types of user input devices of the vehicle 100.

The Bluetooth transceiver module 110 is configured to communicate bi-directionally with mobile electronic devices, such as mobile device 150, via the antenna 130. Examples of the mobile device include a mobile (cellular) phone, a tablet device, and other types of mobile electronic devices that are configured to communicate via one or more cellular networks. The Bluetooth transceiver module 110 and the mobile device 150 communicate according to a Bluetooth protocol (i.e., a protocol defined by the Bluetooth Special Interest Group), such as the Bluetooth Core Specification v2.0.

The mobile device 150 pairs with the Bluetooth transceiver module 110 using a Bluetooth pairing process. The pairing process can be initiated via the mobile device 150 or the hands-free module 120. The pairing process may be initiated, for example, manually in response to user input to the mobile device 150 or one or more of the user input devices indicative of a request to initiate a pairing. Typically, the manual (user initiated) pairing process includes initiating the paring process using the vehicle 100 and selecting the vehicle 100 on an interface of the mobile device 150 interface, or vice versa.

Additionally or alternatively, the pairing can be initiated automatically (without user input), such as in response to detection of the mobile device 150 by the hands-free module 120 or in response to detection of the hands-free module 120 by the mobile device 150. Some pairing processes may require entry of a password or key into the vehicle 100 or mobile device 150.

Once the mobile device 150 is paired with the Bluetooth transceiver module 110, the hands-free module 120 communicates with the Bluetooth transceiver module 110 to wirelessly control the mobile device 150 by the hands-free module 120 via user speech/voice commands.

Figure 2:
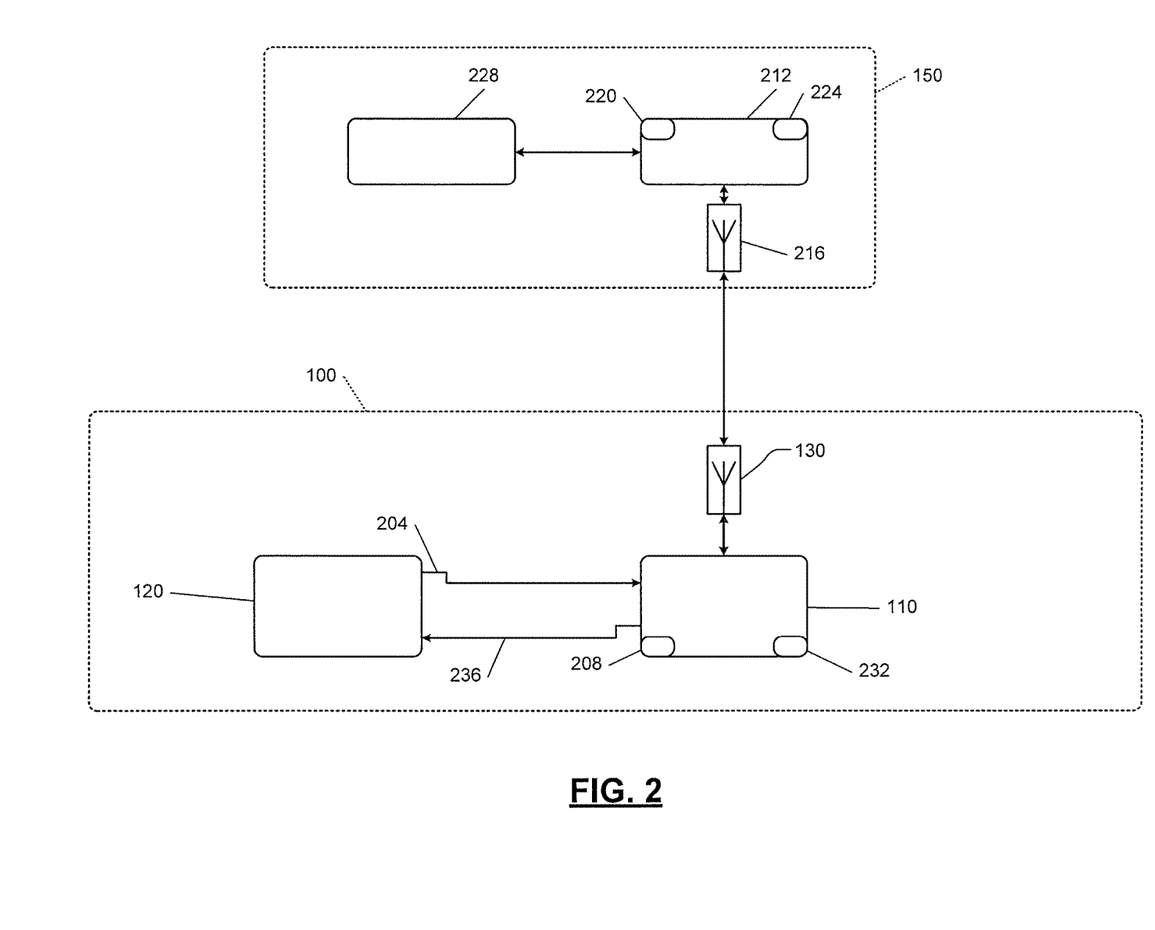
FIG. 2 is a functional block diagram of an example hands-free system including a vehicle and a mobile device.

FIG. 2 is a functional block diagram of an example hands-free system including the hands-free module 120, the Bluetooth transceiver module 110, and the mobile device 150. While the following will be discussed in conjunction with the example of the mobile device 150, the present application is also applicable to other mobile devices. The following discussion regarding the example of FIG. 2 occurs while the mobile device 150 is paired with the Bluetooth transceiver module 110.

The hands-free module 120 selectively transmits attention commands (AT commands) 204 to the Bluetooth transceiver module 110. The transmission of a set of one or more attention commands 204 may be event based (in response to the occurrence of one or more predetermined events), user input based (in response to receipt of one or more inputs indicative of predetermined user inputs), or time based (each predetermined period of time or at one or more predetermined times). Attention commands include the prefix AT+ followed by a command portion and associated data, parameters, and/or requests.

The Bluetooth transceiver module 110 transmits the attention commands to the mobile device 150 according to the Bluetooth protocol via the antenna 130. While the example of the antenna 130 is provided, the Bluetooth transceiver module 110 may transmit and receive signals via one or more antennas.

A list 208 including or consisting of standard attention commands is stored in memory, such as in memory of the Bluetooth transceiver module 110. The standard attention commands include or consist of all of the attention commands defined by the Bluetooth Hands-Free Profile (HFP) specification, version 1.7.1 or later. Examples of standard attention commands include:

AT+CCWA=[XXX],
AT+CHLD=[XXX],
AT+CHUP=[XXX], and
AT+CIND=[XXX], where AT+ denotes an attention command, CCWA denotes the standard call waiting notification attention command defined by the Bluetooth HFP specification, CHLD denotes the standard call hold and multiparty handling attention command defined by the Bluetooth HFP specification, CHUP denotes the standard hang-up attention command defined by the Bluetooth HFP specification, CIND denotes the standard indicator update attention command defined by the Bluetooth HFP specification, and [XXX] denotes associated data, parameters, and/or requests. While the above 4 examples are provided, the HFP specification also includes other standard attention commands. In the examples above, CCWA, CHLD, CHUP, and CIND are the command portions. For example, the list 208 may include or consist of all of the command portions of attention commands defined by the Bluetooth HFP specification. The Bluetooth transceiver module 110 may compare the command portion of an attention command to be transmitted with the list of predetermined command portions defined by the Bluetooth HFP specification.

The standard attention commands are non-specific to any mobile device maker or manufacturer. The standard attention commands are non-specific to any vendor.

Non-standard (e.g., manufacturer specific, vendor specific, device specific, etc.) attention commands (e.g., the command portions) are not included in the list 208 as they are not included in the Bluetooth HFP specification. One example of a non-standard attention command includes the attention commands:

AT+XAPL=[XXX] and
AT+APLSIRI?, where AT+ denotes an attention command, XAPL denotes a non-standard attention command that is specific to devices manufactured by Apple, Inc., of Cupertino, Calif., APLSIRI? denotes a non-standard attention command that is specific to devices manufactured by Apple, Inc., of Cupertino, Calif., and that asks whether the receiving device has the Siri function available, and [XXX] denotes associated parameters/requests. While these examples are provided, other non-standard attention commands are also possible. Based on the non-inclusion of an attention command from the hands-free module 120 in the list, the Bluetooth transceiver module 110 may pass a response to the non-standard attention command received from the mobile device 150 to the hands-free module 120.

The mobile device 150 includes a Bluetooth transceiver module 212 and an antenna 216. The Bluetooth transceiver module 212 receives transmitted attention commands via the antenna 216. While the example of the antenna 216 is provided, the Bluetooth transceiver module 212 may transmit and receive signals via one or more antennas.

A list 220 including or consisting of the standard attention commands (e.g., the command portions) is stored in memory of the mobile device 150, such as in memory of the Bluetooth transceiver module 212. The list 220 may include or consist of the same data as the list 208. As stated above, the standard attention commands include or consist of all of the attention commands defined by the Bluetooth HFP specification, version 1.7.1 or later. Non-standard (e.g., manufacturer specific, vendor specific, device specific, etc.) attention commands are not included in the list 220 as they are not included in the Bluetooth HFP specification. The Bluetooth transceiver module 212 identifies attention commands based on the inclusion of the prefix AT+.

When an attention command is received, the Bluetooth transceiver module 212 compares the received attention command (e.g., the command portion) with the list 220. Based on the comparison, the Bluetooth transceiver module 212 determines whether the received attention command is a standard attention command (that is included in the list 220) or a non-standard attention command (that is not included in the list 220). The Bluetooth transceiver module 212 does this for each received attention command.

If the received attention command (e.g., the command portion) is a standard attention command and is included in the list 220, the Bluetooth transceiver module 212 executes the received attention command and transmits a corresponding response to the vehicle 100 according to predetermined execution and response rules 224. For example, in response to the standard attention command AT+CCWA=[XXX], the Bluetooth transceiver module 212 may output (e.g., audibly and/or visually) a call waiting notification from the mobile device 150. Responses are referred to as results codes in the Bluetooth HFP specification.

The format of responses is defined by the Bluetooth HFP specification. Responses to attention commands remove the prefix AT+, include the command portion of the received attention command, and follow with responses to the data, parameters, and/or requests. For example, a response to the standard attention command AT+CCWA=[XXX] may be:

CCWA=[YYY], where the attention command AT+ has been removed, CCWA denotes the response to the standard call waiting notification attention command CCWA defined by the Bluetooth HFP specification, and [YYY] denotes parameters/data responsive to the parameters/requests [XXX] included in the attention command.

If the received attention command is a non-standard attention command and is therefore not in the list 220, the Bluetooth transceiver module 212 could simply not-execute the non-standard attention command due to the rules 224 not including rules for executing non-standard attention commands. The Bluetooth transceiver module 212 could also transmit a response including a predetermined error message back to the vehicle 100 in response to receiving a non-standard attention command.

According to the present disclosure, if the received attention command is a non-standard attention command and is not in the list 220, the Bluetooth transceiver module 212 may pass the received attention command to an application module 228. The application module 228 may determine whether it recognizes the received attention command. If the application module 228 recognizes the received attention command, the application module 228 may execute the received attention command and transmit a response to the Bluetooth transceiver module 212 for transmission to the vehicle 100 that does not include the predetermined error message.

For example, in response to the non-standard attention command AT+XAPL=[XXX], the application module 228 may determine requested parameters of the mobile device 150 and transmit a response to the Bluetooth transceiver module 212 including the requested parameters and not the predetermined error message. An example of a response to the non-standard attention command attention command AT+XAPL=[XXX] includes:

XAPL=[YYY], where the attention command AT+ has been removed, XAPL denotes the response to the non-standard attention command AT+XAPL, and [YYY] denotes parameters/data responsive to the parameters/requests [XXX] included in the non-standard attention command AT+XAPL.

An example of a response to the non-standard attention command attention command AT+APLSIRI? includes:

APLSIRI=[YYY], where the attention command AT+ has been removed, APL-SIRI denotes the response to the non-standard attention command AT+APLSIRI?, and [YYY] denotes parameters/data responsive to the non-standard attention command AT+APLSIRI?.

The Bluetooth transceiver module 212 transmits responses to the vehicle 100 via the antenna 216 or one or more other antennas. In various implementations, separate the vehicle 100 may include separate transmit and receive antennas, and/or the mobile device 150 may include separate transmit and receive antennas.

If the application module 228 does not recognize the received attention command, the application module 228 may command the Bluetooth transceiver module 212 to transmit a response including the predetermined error message back to the vehicle 100 in response to the non-standard attention command.

The Bluetooth transceiver module 110 receives responses to attention commands from the Bluetooth transceiver module 212. A list 232 including or consisting of standard responses to attention commands may be stored in memory, such as in memory of the Bluetooth transceiver module 110. The standard responses include or consist of all of the standard responses (e.g., the command portions) defined by the Bluetooth HFP specification to the standard attention commands. Example standard responses include:

CCWA=[YYY],
CHLD=[YYY],
CHUP=[YYY], and
CIND=[YYY], where, CCWA denotes the standard response to the standard call waiting notification attention command AT+CCWA, CHLD denotes the standard response to the standard call hold and multiparty handling attention command AT+CHLD, CHUP denotes the standard response to the standard hang-up attention command AT+CHUP, CIND denotes the standard response to the standard indicator update attention command AT+CIND, and [YYY] denotes parameters/data responsive to the associated standard attention command. While the above 4 examples are provided, the HFP specification also includes other standard responses.

The standard responses are also non-specific to any mobile device maker or manufacturer. The standard responses are also non-specific to any vendor. Non-standard (e.g., manufacturer specific, vendor specific, device specific, etc.) responses to non-standard attention commands are not included in the list 232 as they are not included in the Bluetooth HFP specification.

When a response is received, the Bluetooth transceiver module 110 may compare the received response with the list 232. Based on the comparison, the Bluetooth transceiver module 110 may determine whether the received response is a standard response (that is included in the list 232) or a non-standard response (that is not included in the list 232). In various implementations, the list 232 may be omitted, and the Bluetooth transceiver module 110 may compare the response portion (e.g., CCWA, CHLD, CHUP, CIND) of each received response with the list 208. The Bluetooth transceiver module 110 does this for each received response.

If the received response is a standard response, the Bluetooth transceiver module 110 continues and may, for example, process or execute based on the standard response. If the received response is a non-standard response, the Bluetooth transceiver module 110 could disconnect and end the pairing between the vehicle 100 and the mobile device 150 (and more specifically between the Bluetooth transceiver module 110 and the Bluetooth transceiver module 212).

According to the present disclosure, if the received response is a non-standard response, the Bluetooth transceiver module 110 does not automatically disconnect and end the pairing. Instead, the Bluetooth transceiver module 110 passes the received response to the hands-free module 120. Communication of received responses to the hands-free module 120 is illustrated in FIG. 2 by 236. The hands-free module 120 may determine whether it recognizes the received response.

If the hands-free module 120 recognizes the received response, the hands-free module 120 may perform one or more predetermined actions based on the received response. For example, in response to the non-standard response XAPL=[YYY], the hands-free module 120 may transmit a predetermined attention command (e.g., AT+APLSIRI?) to the Bluetooth transceiver module 110 for transmission to the mobile device 150.

If the hands-free module 120 does not recognize the received response, the hands-free module 120 may command the Bluetooth transceiver module 110 to disconnect and end the pairing between the vehicle 100 and the mobile device 150 (and more specifically between the Bluetooth transceiver module 110 and the Bluetooth transceiver module 212). The Bluetooth transceiver module 110 disconnects and ends the pairing between the vehicle 100 and the mobile device 150 in response to the command.

In response to a response including the predetermined error message, the Bluetooth transceiver module 110 could disconnect and end the pairing between the vehicle 100 and the mobile device 150. According to the present disclosure, the Bluetooth transceiver module 110 does not automatically disconnect and end the pairing. Instead, the Bluetooth transceiver module 110 passes the received response including the predetermined error message to the hands-free module 120. The hands-free module 120 performs one or more predetermined actions based on the received response including the predetermined error message.

For example, in response to the received response including the predetermined error message, the hands-free module 120 may transmit a predetermined attention command to the Bluetooth transceiver module 110 for transmission to the mobile device 150. The predetermined attention command may be a predetermined standard attention command or a predetermined non-standard attention command. The predetermined attention command may be the same as or different than the attention command transmitted that resulted in the receipt of the response including the predetermined error message. As an alternative to transmitting a predetermined attention command, in response to the received response including the predetermined error message, the hands-free module 120 command the Bluetooth transceiver 110 to disconnect and end the pairing between the vehicle 100 and the mobile device 150. The Bluetooth transceiver module 110 disconnects and ends the pairing between the vehicle 100 and the mobile device 150 in response to the command.

Figure 3:
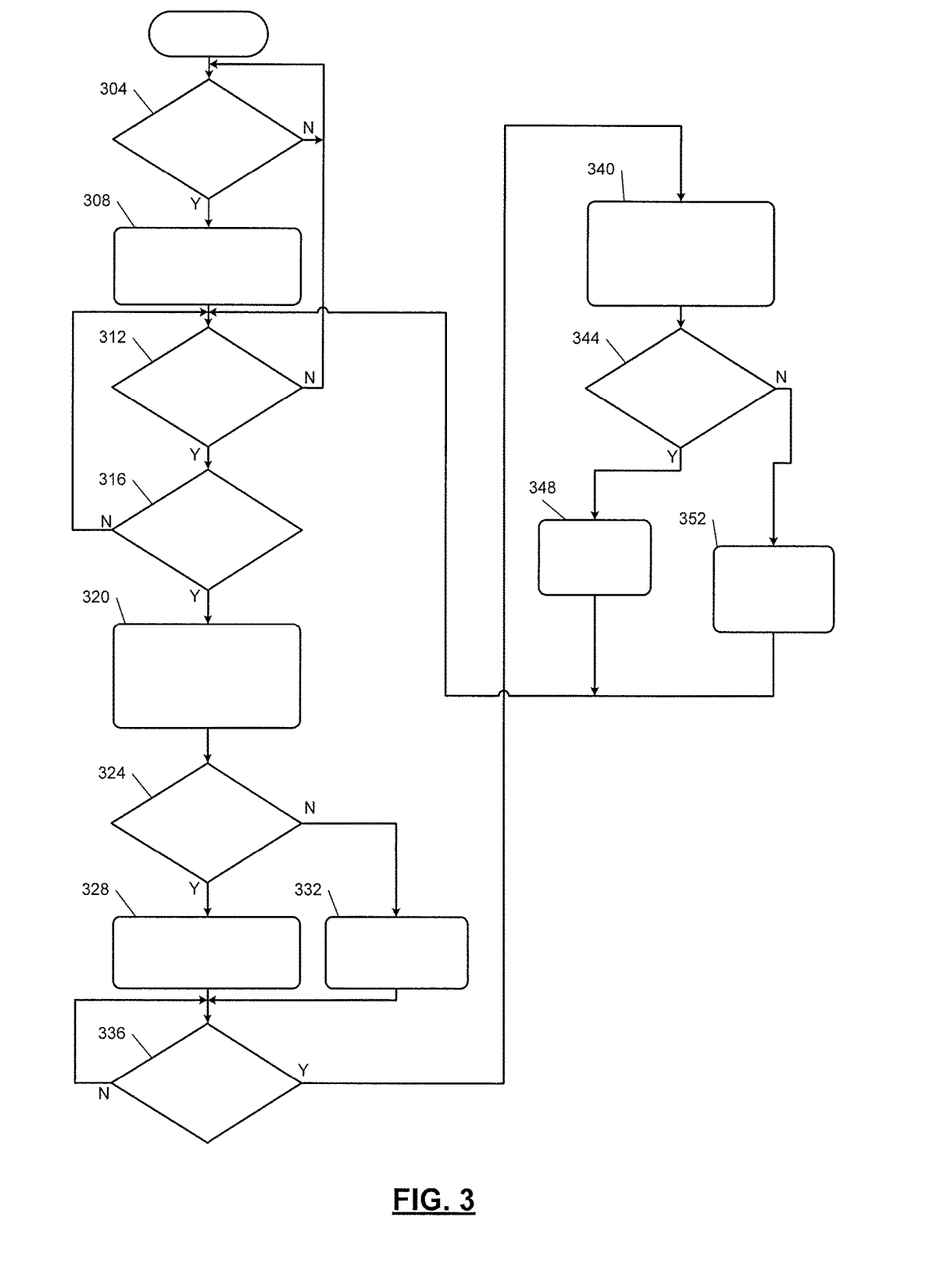
FIG. 3 is a flowchart depicting an example method of transmitting attention commands and receiving responses to attention commands by a vehicle.

FIG. 3 includes a flowchart depicting an example method of transmitting attention commands and receiving responses to attention commands by the vehicle 100. Control begins with 304 where the Bluetooth transceiver module 110 determines whether a pairing request has been received. A pairing request may be received, for example, automatically (e.g., in response to detection of the vehicle 100 by the mobile device 150 or detection of the mobile device 150 by the vehicle 100) or manually (e.g., in response to user input to the mobile device 150 or in response to user input to one or more of the user input devices 140). If 304 is true, the Bluetooth transceiver module 110 pairs with the Bluetooth transceiver module 212 of the mobile device 150 at 308 and control continues with 312. If 304 is false, control remains at 304.

At 312, the Bluetooth transceiver module 110 determines whether it is still paired with the mobile device 150. If 312 is true, control continues with 316. If 312 is false, control returns to 304. At 316, the Bluetooth transceiver module 110 determines whether an attention command has been received. As discussed above, the hands-free module 120 may transmit attention commands when one or more events occur, in response to receipt of one or more user inputs (e.g., via one or more of the user input devices 140), and/or at one or more predetermined times. If 316 is true, control continues with 320. If 316 is false, control returns to 312.

At 320, the Bluetooth transceiver module 110 compares the received attention command (e.g., the command portion) with the list 208 including the standard attention commands (e.g., the command portions) defined by the Bluetooth HFP specification. At 324, the Bluetooth transceiver module 110 determines whether the received attention command (e.g., the command portion) is in the list 208. If 324 is true, the Bluetooth transceiver module 110 transmits the standard attention command to the mobile device 150 via the antenna 130 at 328, and control continues with 336. If 324 is false, the Bluetooth transceiver module transmits the non-standard attention command to the mobile device 150 via the antenna 130 at 332, and control continues with 336.

At 336, the Bluetooth transceiver module 110 determines whether a response to the transmitted attention command has been received from the mobile device 150. If 336 is false, control may remain at 336. Control may timeout and a response is to the transmitted attention command within a predetermined period after the transmission of the attention command. If 336 is true, control may continue with 340.

At 340, the Bluetooth transceiver module 110 compares the received response (e.g., the response portion) with the list 232 or the list 208. At 344, the Bluetooth transceiver module 110 determines whether the received response (e.g., the response portion) is in the list 232 or the list 208. If 340 is true, the Bluetooth transceiver module 110 processes the received response at 348, and control returns to 312. If 340 is false, the received response is a non-standard response, and control continues with 352.

At 352, the Bluetooth transceiver module 110 does not automatically disconnect and end the pairing with the mobile device 150. Instead, the Bluetooth transceiver module 110 transmits the received response to the hands-free module 120 at 352. The hands-free module 120 processes the received response if the hands-free module 120 recognizes the received response or commands the Bluetooth transceiver module 110 to disconnect and end the pairing.

The above enables transmission of non-standard attention commands that are not defined by the Bluetooth HFP specification and receipt of non-standard responses. The above also allows for the hands-free module 120 to process non-standard responses to non-standard attention commands and to possibly avoid disconnection/ending pairing.

Figure 4:
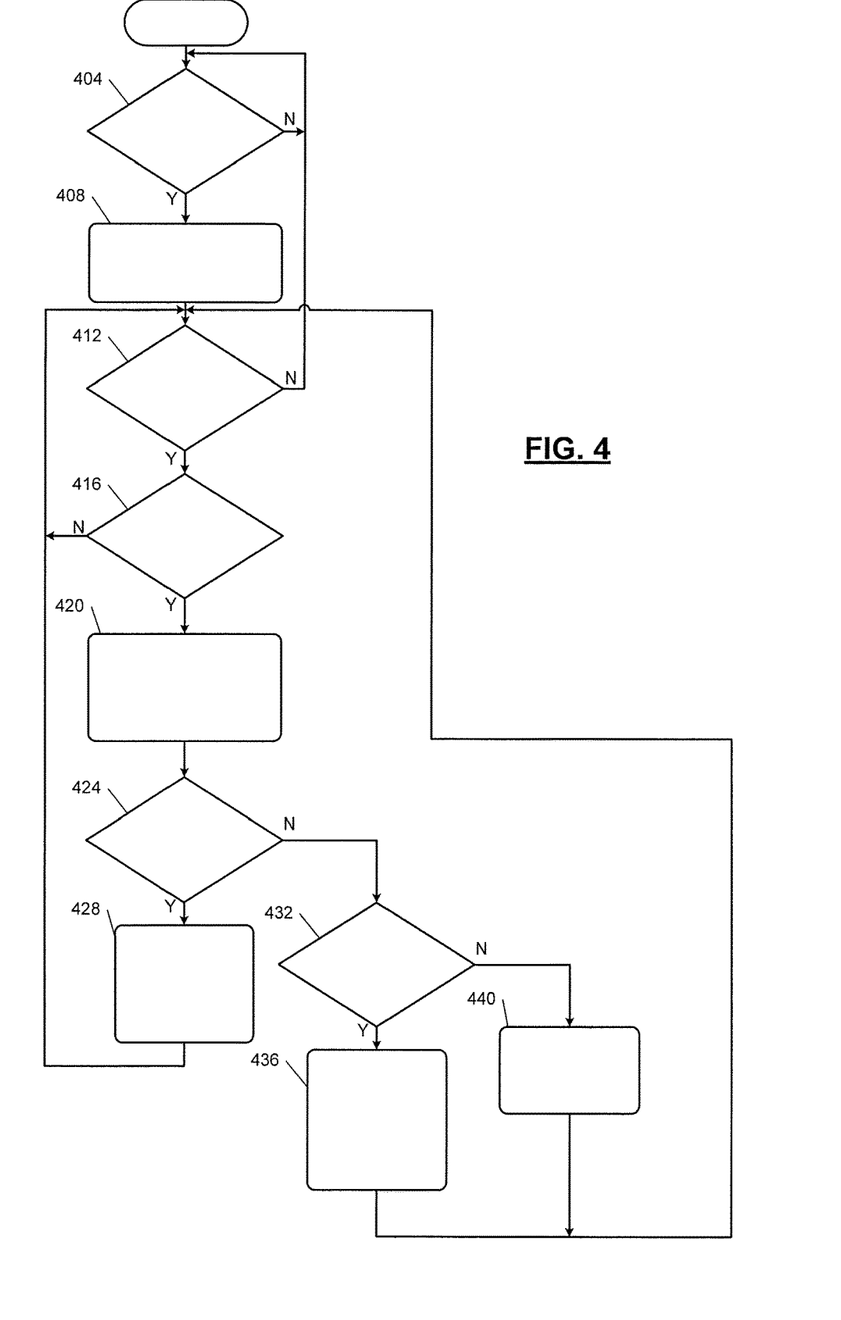
FIG. 4 is a flowchart depicting an example method of receiving attention commands and transmitting responses to attention commands by a mobile device.

FIG. 4 includes a flowchart depicting an example method of receiving attention commands and transmitting responses to attention commands by the mobile device 150. Control begins with 404 where the Bluetooth transceiver module 212 determines whether a pairing request has been received. A pairing request may be received, for example, automatically (e.g., in response to detection of the vehicle 100 by the mobile device 150 or detection of the mobile device 150 by the vehicle 100) or manually (e.g., in response to user input to the mobile device 150 or in response to user input to one or more of the user input devices 140). If 404 is true, the Bluetooth transceiver module 212 of the mobile device 150 pairs with the Bluetooth transceiver module 110 of the vehicle at 408, and control continues with 412. If 404 is false, control remains at 404.

At 412, the Bluetooth transceiver module 212 determines whether it is still paired with the vehicle 100. If 412 is true, control continues with 416. If 412 is false, control returns to 404. At 416, the Bluetooth transceiver module 212 determines whether an attention command has been received from the vehicle 100. As discussed above, the hands-free module 120 may transmit attention commands when one or more events occur, in response to receipt of one or more user inputs (e.g., via one or more of the user input devices 140), and/or at one or more predetermined times. If 416 is true, control continues with 420. If 416 is false, control returns to 412.

At 420, the Bluetooth transceiver module 212 compares the received attention command (e.g., the command portion) with the list 220 including the standard attention commands defined by the Bluetooth HFP specification. At 424, the Bluetooth transceiver module 212 determines whether the received attention command (e.g., the command portion) is in the list 220. If 420 is true, the Bluetooth transceiver module 212 executes the received attention command according to the rules 224 and generates a response that is responsive to the received attention command at 428. The Bluetooth transceiver module 212 transmits the response to the vehicle 100 at 428, and control returns to 412. If 420 is false, the received attention command is a non-standard attention command. Instead of transmitting a response including the predetermined error message, the Bluetooth transceiver module 212 may transmit the received attention command to the application module 228, and control may transfer to 432. Alternatively, the Bluetooth transceiver module 212 may transmit a response including the predetermined error message to the vehicle 100, and control may return to 412.

At 432, the application module 228 may determine whether the application module 228 recognizes and can process the received attention command. If 432 is true, the application module 228 processes the received attention command and generates a response that is responsive to the received attention command at 436. The Bluetooth transceiver module 212 transmits the response (including the response/command portion that is not defined by the Bluetooth HFP specification) to the vehicle 100. The response is non-standard in this example because the attention command itself was non-standard. If 432 is false, the application module 228 may be unable to process the received attention command. At 440, the application module 228 may therefore command the Bluetooth transceiver module 212 to transmit a response including the predetermined error message back to the vehicle 100. The Bluetooth transceiver module 212 transmits the response including the predetermined error message to the vehicle 100 in response to the command.

The above enables receipt of non-standard attention commands and transmission of non-standard responses that are not defined by the Bluetooth HFP specification. The above also allows for the application module 228 to process and respond to non-standard attention commands and to possibly avoid disconnection/ending pairing.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A hands-free system of a vehicle, comprising:
a Bluetooth transceiver module configured to pair with a mobile electronic device that is configured to communicate with a cellular network; and
a hands-free module configured to, while the mobile electronic device is paired, selectively generate attention commands for transmission to the mobile electronic device, the attention commands including:
standard attention commands that are defined by Bluetooth Hands-Free Profile (HFP) specification version 1.7.1; and
non-standard attention commands that are not defined by the Bluetooth HFP specification,
wherein the Bluetooth transceiver module is further configured to:
transmit the attention commands to the mobile electronic device;
from the mobile electronic device, receive:
first responses to the standard attention commands defined by the Bluetooth HFP specification, respectively; and
second responses to non-standard attention commands that are not defined by the Bluetooth HFP specification;
in response to receipt of one of the second responses to a non-standard attention command that is not defined by the Bluetooth HFP specification, pass the one of the second responses to the hands-free module; and
in response to receipt of the one of the second responses:
not automatically disconnect from the mobile electronic device and end the pairing;
compare the one of the second responses with a stored list including only the first responses to attention commands that are defined by the Bluetooth HFP specification, respectively; and
pass the one of the second responses to the hands-free module based on the one of the second responses not being included in the stored list.

2. The hands-free system of claim 1 wherein the hands-free module is further configured to process the one of the second responses.

3. The hands-free system of claim 1 wherein:
the hands-free module is further configured to, in response to the one of the second responses, selectively command the Bluetooth transceiver module to disconnect from the mobile electronic device and end the pairing; and
the Bluetooth transceiver module is configured to disconnect from the mobile electronic device and end the pairing in response to the command.

4. The hands-free system of claim 1 wherein the Bluetooth transceiver module is configured to:
compare the non-standard attention command that is not defined by the Bluetooth HFP specification with a second stored list including only attention commands that are defined by the Bluetooth HFP specification; and
pass the one of the second responses to the hands-free module based on the non-standard attention command not being included in the second stored list.

5. The hands-free system of claim 1 wherein the Bluetooth transceiver module is configured to:
compare a command portion of the non-standard attention command with a second stored list including only predetermined command portions of attention commands that are defined by the Bluetooth HFP specification; and
pass the one of the second responses to the hands-free module based on the command portion of the non-standard attention command not being included in the second stored list.

6. The hands-free system of claim 1 wherein the Bluetooth transceiver module is configured to:
compare a response portion of the one of the second responses with a second stored list including only predetermined portions of attention commands that are defined by the Bluetooth HFP specification; and
pass the one of the second responses to the hands-free module based on the response portion of the one of the second responses not being included in the second stored list.

7. The hands-free system of claim 1 wherein the non-standard attention command includes an attention command that is specific to one mobile electronic device manufacturer.

8. The hands-free system of claim 1 wherein the non-standard attention command includes an attention command that is specific to one operating system.

9. A system comprising:
the hands-free system of claim 1; and
the mobile electronic device that is configured to communicate with the cellular network.

10. The system of claim 9 wherein the mobile electronic device is configured to, while paired:
receive standard attention commands that are defined by the Bluetooth HFP specification;
receive non-standard attention commands that are not defined by the Bluetooth HFP specification;

generate the first responses to the standard attention commands that are defined by the Bluetooth HFP specification, respectively;
generate the second responses to the non-standard attention commands that are not defined by the Bluetooth HFP specification; and
transmit the first and second responses to the Bluetooth transceiver module.

11. The system of claim 10 wherein the mobile electronic device is configured to generate the second responses to indicate a predetermined error in response to determinations that the non-standard attention commands are not included in a second stored list including only attention commands defined by the Bluetooth HFP specification.

12. The system of claim 11 wherein the mobile electronic device is configured to, in response to determinations that the standard attention commands are included in the second stored list:
process the standard attention commands according to predetermined rules; and
generate the first responses based on the processing of the standard attention commands, respectively.

13. A hands-free system, comprising:
a mobile electronic device that is configured to communicate with a cellular network; and
a vehicle comprising:
a Bluetooth transceiver module configured to pair with the mobile device; and
a hands-free module configured to, while the mobile electronic device is paired, selectively generate attention commands for transmission to the mobile electronic device, the attention commands including:
standard attention commands that are defined by Bluetooth Hands-Free Profile (HFP) specification version 1.7.1; and
non-standard attention commands that are not defined by the Bluetooth HFP specification,
wherein the Bluetooth transceiver module is further configured to:
transmit the attention commands to the mobile electronic device;
from the mobile electronic device, receive:
first responses to the standard attention commands defined by the Bluetooth HFP specification, respectively; and
second responses to non-standard attention commands that are not defined by the Bluetooth HFP specification; and
in response to receipt of one of the second responses to a non-standard attention command that is not defined by the Bluetooth HFP specification:
not automatically disconnect from the mobile electronic device and end the pairing; and
pass the one of the second responses to the hands-free module,
wherein the hands-free module is further configured to selectively one of:
process the one of the second responses; and
command the Bluetooth transceiver module to disconnect from the mobile electronic device and end the pairing,
wherein the Bluetooth transceiver module is further configured to:
compare a response portion of the one of the second responses with a stored list including only predetermined portions of attention commands that are defined by the Bluetooth HFP specification; and
pass the one of the second responses to the hands-free module based on the response portion of the one of the second responses not being included in the stored list, and
wherein the non-standard attention command includes an attention command that is specific to one of:
one mobile electronic device manufacturer; and
one operating system.

14. A hands-free method for a vehicle, comprising:
by a Bluetooth transceiver module of the vehicle, pairing with a mobile electronic device that is configured to communicate with a cellular network;
selectively generating attention commands for transmission to the mobile electronic device, the attention commands including:
standard attention commands that are defined by Bluetooth Hands-Free Profile (HFP) specification version 1.7.1; and
non-standard attention commands that are not defined by the Bluetooth HFP specification,
by the Bluetooth transceiver module:
transmitting the attention commands to the mobile electronic device;
from the mobile electronic device, receiving:
first responses to the standard attention commands defined by the Bluetooth HFP specification, respectively; and
second responses to non-standard attention commands that are not defined by the Bluetooth HFP specification; and
by the Bluetooth transceiver module, in response to receipt of one of the second responses to a non-standard attention command that is not defined by the Bluetooth HFP specification, passing the one of the second responses to a hands-free module of the vehicle including, in response to receipt of the one of the second responses;
not automatically disconnecting from the mobile electronic device and end the pairing;
comparing the one of the second responses with a stored list including only the first responses to attention commands that are defined by the Bluetooth HFP specification, respectively; and
pass the one of the second responses to the hands-free module based on the one of the second responses not being included in the stored list.

15. The hands-free method of claim 14 further comprising, by the hands-free module, processing the one of the second responses.

16. The hands-free method of claim 14 wherein the non-standard attention command includes an attention command that is specific to one mobile electronic device manufacturer.

17. The hands-free method of claim 14 wherein the non-standard attention command includes an attention command that is specific to one operating system.

* * * * *

UNITED STATES PATENT AND TRADEMARK OFFICE
CERTIFICATE OF CORRECTION

PATENT NO. : 10,523,802 B2
APPLICATION NO. : 15/782927
DATED : December 31, 2019
INVENTOR(S) : Steven Hartley Page 1 of 1

It is certified that error appears in the above-identified patent and that said Letters Patent is hereby corrected as shown below:

On the Title Page

Item number (54):    Delete "HANDING" and insert --HANDLING--

Signed and Sealed this
Twenty-fifth Day of February, 2020

Andrei Iancu
*Director of the United States Patent and Trademark Office*